US005673086A

United States Patent [19]
Fukuoka et al.

[11] Patent Number: 5,673,086
[45] Date of Patent: Sep. 30, 1997

[54] IMAGE ASPECT RATIO CONVERSION PROCESSING APPARATUS

[75] Inventors: Hiroyuki Fukuoka, Hiratsuka; Koji Takahashi; Hisataka Hirose, both of Yokohama, all of Japan

[73] Assignee: Canon Kabushiki Kaisha, Tokyo, Japan

[21] Appl. No.: 175,188

[22] Filed: Dec. 29, 1993

Related U.S. Application Data

[63] Continuation of Ser. No. 771,179, Oct. 4, 1991, abandoned.

[30] Foreign Application Priority Data

Oct. 5, 1990 [JP] Japan .................... 2-266457
Sep. 3, 1991 [JP] Japan .................... 3-222763

[51] Int. Cl.$^6$ ............ H04N 7/01; H04N 11/20; H04N 9/74; H04N 3/223
[52] U.S. Cl. .......... 348/445; 348/458; 348/581; 348/704
[58] Field of Search .................... 348/445, 441, 348/448, 449, 458, 722, 478, 434, 469, 426, 439, 556, 558, 555, 561, 604, 704, 581; H04N 7/01, 5/46, 5/45, 11/20, 9/74, 3/223

[56] References Cited

U.S. PATENT DOCUMENTS

| | | | |
|---|---|---|---|
| 4,223,343 | 9/1980 | Belmares-Sarabia et al. | 358/54 |
| 4,310,856 | 1/1982 | Poetsch et al. | 358/214 |
| 4,476,493 | 10/1984 | Poetsch et al. | 358/214 |
| 5,084,765 | 1/1992 | Morita et al. | 358/141 |
| 5,136,398 | 8/1992 | Rodriguez-Cavazos et al. | 358/242 |
| 5,353,065 | 10/1994 | Katsumata et al. | 348/556 |

FOREIGN PATENT DOCUMENTS

| | | | |
|---|---|---|---|
| 60-165883 | 8/1985 | Japan | H04N 7/01 |
| 63-193779 | 8/1988 | Japan | H04N 5/46 |

*Primary Examiner*—Victor R. Kostak
*Assistant Examiner*—John W. Miller
*Attorney, Agent, or Firm*—Fitzpatrick, Cella, Harper & Scinto

[57] ABSTRACT

An image processing apparatus, for processing a compressed image signal corresponding to an image obtained by optically compressing an object image with a predetermined compression rate, receives the compressed image signal, effects an expansion process on the compressed image signal according to the compression rate thereof, and extracts and releases an image signal corresponding to a part of the image represented by the image signal formed by the expansion, thereby enabling to display a distortion-free image on a monitor.

7 Claims, 8 Drawing Sheets

SCANNING LINES 4, 8, 12, ......
ARE THINNED OUT

IMAGE ASPECT RATIO CONVERSION PROCESSING APPARATUS

This application is a continuation of application Ser. No. 07/771,179, filed Oct. 4, 1991, now abandoned.

BACKGROUND OF THE INVENTION

1. Field of the Invention

The present invention relates to an image processing apparatus for processing an image, and more particularly to an image processing apparatus for processing an image signal corresponding to an image compressed in the horizontal or vertical direction.

2. Related Background Art

Conventional television systems, such as NTSC system, employ an aspect ratio (vertical-to-horizontal ratio of the image) of 3:4, but there have been attempts, in recent years, for obtaining a wider image which is longer in the horizontal direction than in the conventional television systems, in order to increase the realistic feeling of the image.

As an example, there is conceived a system for displaying a horizontally wider image, by taking an object through a particular optical system, called anamorphic lens, thereby obtaining an image signal corresponding to an object image which is optically compressed in the horizontal direction with a predetermined compression rate, and supplying said image signal to a video projector equipped, in front of the projection lens thereof with an optical system of characteristics inverse to those of said anamorphic lens, for projecting an image corresponding to said image signal, thereby optically expanding the image which is optically compressed in the horizontal direction at the phototaking.

However, if the above-mentioned image signal, compressed in the horizontal direction with a predetermined compression rate, is displayed on a monitor of the ordinary aspect ratio, there is obtained a distorted image, which is compressed in the horizontal direction and is very unpleasant to watch.

SUMMARY OF THE INVENTION

An object of the present invention is to provide an image processing apparatus capable of resolving the above-mentioned drawback.

Another object of the present invention is to provide an image processing apparatus capable of displaying a compressed image signal, corresponding to an image in which the object image is optically compressed with a predetermined compression rate, in the state of a distortion-free image on a monitor or the like.

The foregoing objects can be attained, according an embodiment of the present invention, by an image processing apparatus for processing a compressed image signal corresponding to an image in which the object image is optically compressed with a predetermined compression rate, comprising image signal process means for receiving said compressed image signal, expanding said compressed image signal according to the compression rate thereof, and releasing an image signal corresponding to a part of an image corresponding to the image signal obtained by said expansion process.

Still another object of the present invention is to provide an image processing apparatus capable of displaying a compressed image signal corresponding to an image, obtained by optical compression of an object image of an arbitrary aspect ratio and having an aspect ratio different from said arbitrary aspect ratio, in the state of a distortion-free image on a monitor or the like.

The above-mentioned object can be attained, according to an embodiment of the present invention, by an image processing apparatus for processed a compressed image signal corresponding to an image, obtained by optical compression of an object image of a first aspect ratio and having a second aspect ratio different from said first aspect ratio, comprising:

image signal expansion means for receiving said compressed image signal, expanding said compressed image signal to an image signal corresponding to an image of said first aspect ratio, and releasing an image signal corresponding to at least a part of an image represented by the image signal formed by said expansion process; and image display means having a display image frame of said second aspect ratio and adapted to display an image corresponding to at least a part of the image represented by the image signal released by said image signal expansion means.

Still other objects of the present invention, and the advantages thereof, will become fully apparent from the following description of the embodiments of the present invention, to be taken in conjunction with the attached drawings.

DETAILED DESCRIPTION OF THE PREFERRED EMBODIMENTS

Now the present invention will be clarified in detail by preferred embodiments thereof.

Figure 1:
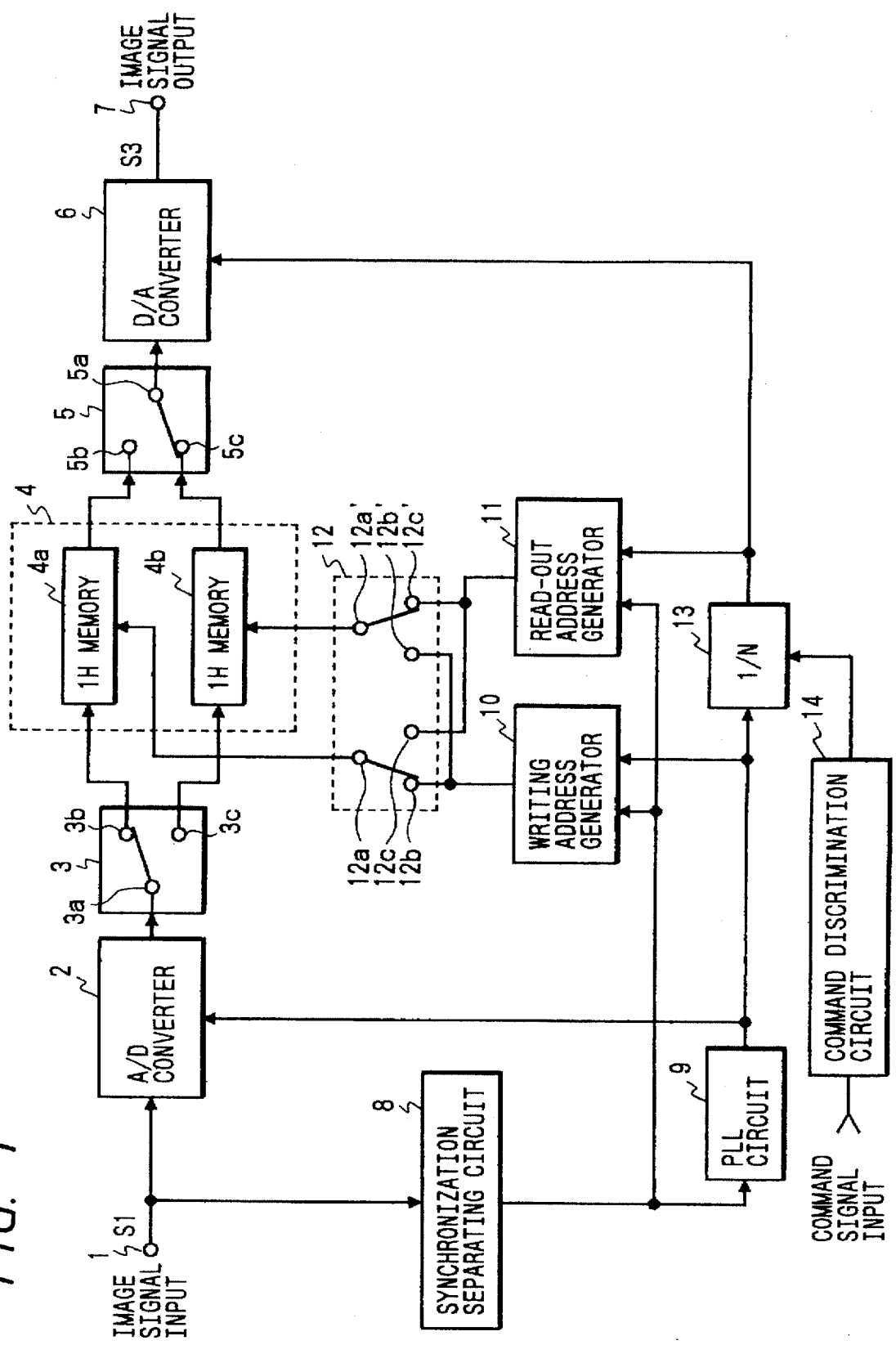
FIG. 1 is a block diagram of an image processing apparatus constituting a first embodiment of the present invention.
Figure 2:
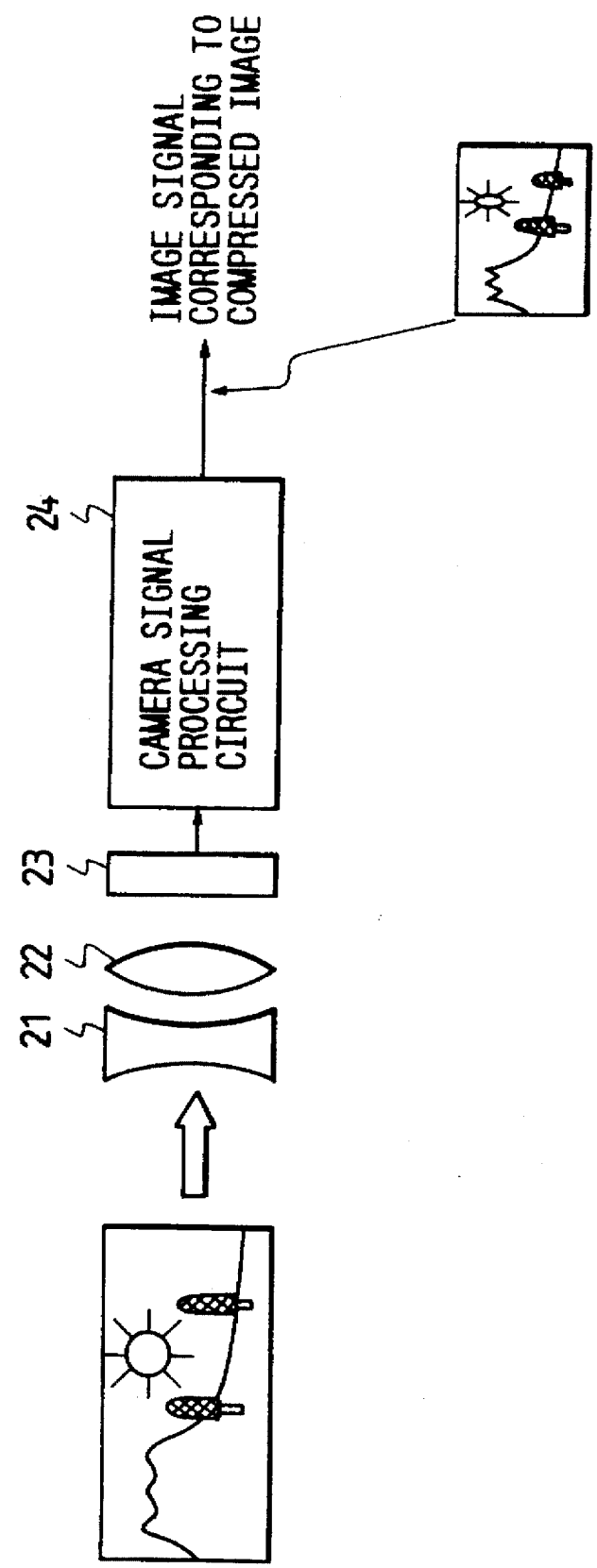
FIG. 2 is a block diagram of an image signal generator for generating a compressed image signal to be supplied to the image processing apparatus shown in FIG. 1.
Figure 3:
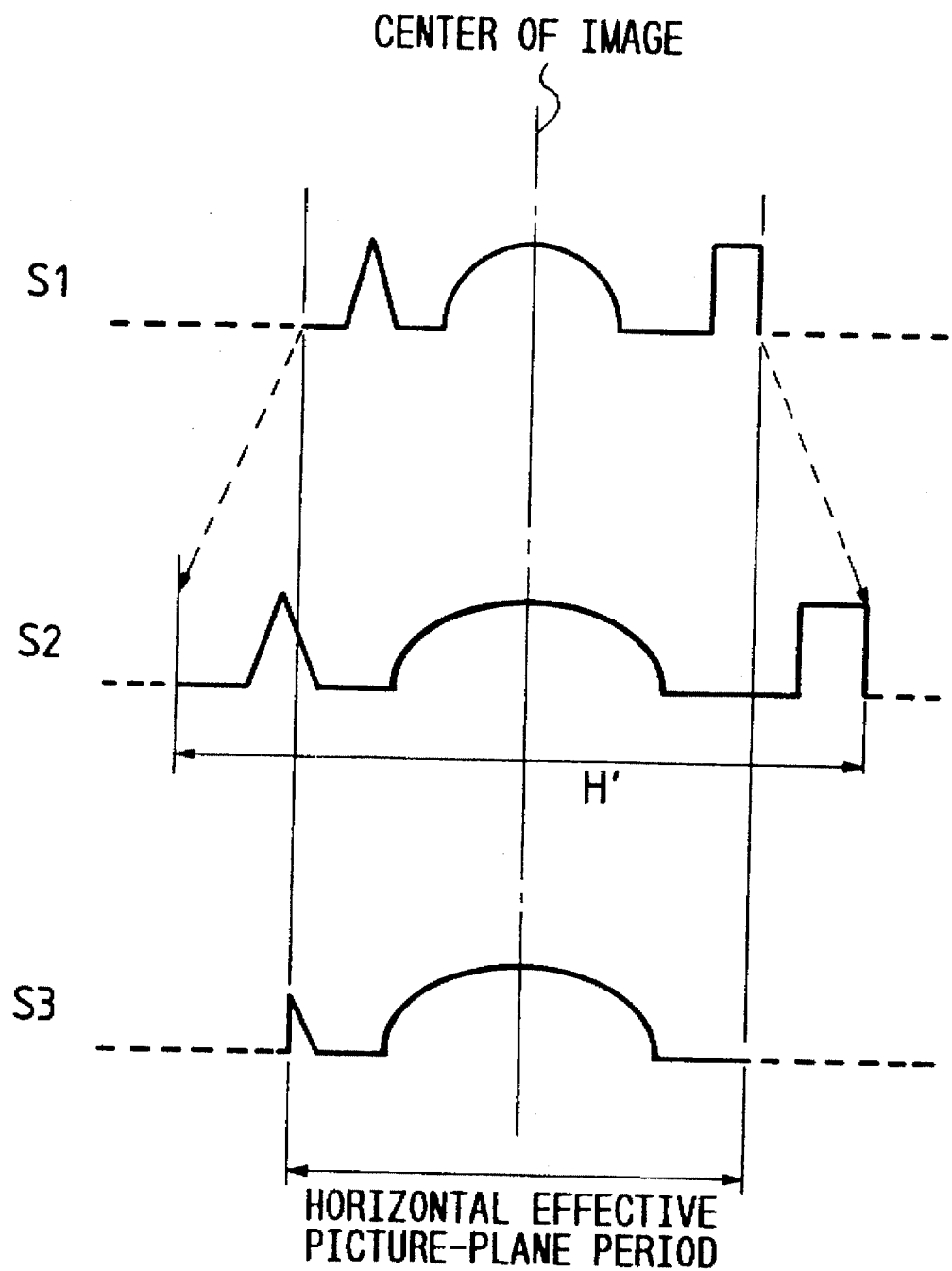
FIG. 3 is a wave form chart showing the image signal to be processed by the image processing apparatus shown in FIG. 1.

FIG. 1 is a block diagram of an image processing apparatus constituting a first embodiment of the present invention, FIG. 2 is a block diagram of an image signal generator for generating a compressed image signal to be supplied to the image processing apparatus shown in FIG. 1, and FIG. 3 is a view for explaining the function of said image processing apparatus shown in FIG. 1.

In FIG. 1, an input terminal 1 receives an image signal corresponding to a horizontally compressed image. Said input image signal corresponds to a photographed image formed, for example in an image signal generator as shown in FIG. 2, by taking an object through an anamorphic lens 21 having different image magnifications in the vertical and horizontal directions. In FIG. 2 there are also shown a phototaking lens 22, an image pickup device 23 with an aspect ratio of 3:4, and a camera signal processing circuit 24. The structure other than said anamorphic lens is equivalent to that in the conventional video camera and will not, therefore, be explained in further detail.

The analog image signal, generated by the image signal generator shown in FIG. 2 and supplied to the input terminal 1 in FIG. 1, is converted into a digital signal by an A/D converter 2 and supplied to an input switching circuit 3. In said circuit, the digital image signal is supplied to and temporarily stored in a memory circuit 4, consisting of 1H memories 4a, 4b, each capable of storing the digital image signal of a horizontal scanning period. More specifically the input switching circuit 3 alternately distributes the input digital image signal, supplied to an input terminal 3a, to two output contacts 3b, 3c by every horizontal scanning period, whereby said digital image signal distributed to the contact 3b is supplied to the 1H memory 4a while that distributed to the contact 3c is supplied to the other 1H memory 4b.

The digital image signal stored in said 1H memories 4 is alternately read by every horizontal scanning period and supplied to an output switching circuit 5. The storage and readout of the digital image signal into or from the above-mentioned 1H memories 4 are conducted in alternate manner by every horizontal scanning period. More specifically, while the digital image signal is stored in the 1H memory 4a, that stored in the 1H memory 4b is read, and, while the digital image signal is stored in the 1H memory 4b, that stored in the 1H memory 4a is read.

The above-mentioned memory circuit 4 is controlled by a writing address generator 10 and a readout address generator 11, and an address switching circuit 12 switches the address signals for writing and readout at every horizontal scanning period.

The writing address generator 10 and the readout address generator 11 generate address signals, based on the synchronization signal contained in the analog image signal supplied to the terminal 1. More specifically, the writing address generator 10 generates writing address signals, based on the synchronization signal separated from the input analog image signal in a synchronization separating circuit 8 and on clock signals formed in a PLL (phase locked loop) circuit 9 in synchronization with said synchronization signal. Also the read out address generator 11 generates readout address signals, based on the synchronization signal released from the synchronization separating circuit 8 and on clock signals obtained by frequency into 1/N (N being an integer), in a frequency divider 13, of the clock signals from said PLL circuit 9. The frequency division ratio 1/N in said frequency divider 13 is controlled by a command discrimination circuit 14, according to a command signal entered from an unrepresented operation unit, in such a manner that the expansion process in the horizontal direction on the digital image signal released from the memory circuit can be conducted simultaneously with the selection and release of a horizontal effective image period. Said command signal is data on the compression rate, entered from the unrepresented operation unit.

The digital image signal is released from the memory circuit 4, with alternate switching in the output switching circuit 5 at every horizontal scanning period, then inversely converted in a D/A converter 6 into an analog image signal and released from an output terminal 7.

FIG. 3 illustrates the wave form of the image signal processed in the image processing apparatus shown in FIG. 1, wherein S1 is the wave form of the input image signal, S2 is the wave form when said input image signal is expanded in the horizontal direction, and S3 is the wave form of said expanded image signal selected and cut out corresponding to the effective horizontal image period, based on the center of the image plane. In the image processing apparatus shown in FIG. 1, the memory circuit 4 is utilized for forming the image signals of the wave forms represented by S2 and S3.

The above-explained first embodiment of the present invention effects image processing based on digital signal processing. In the following there will be explained a second embodiment of the present invention effecting image processing based on analog signal processing, with reference to FIGS. 4 and 5.

Figure 4:
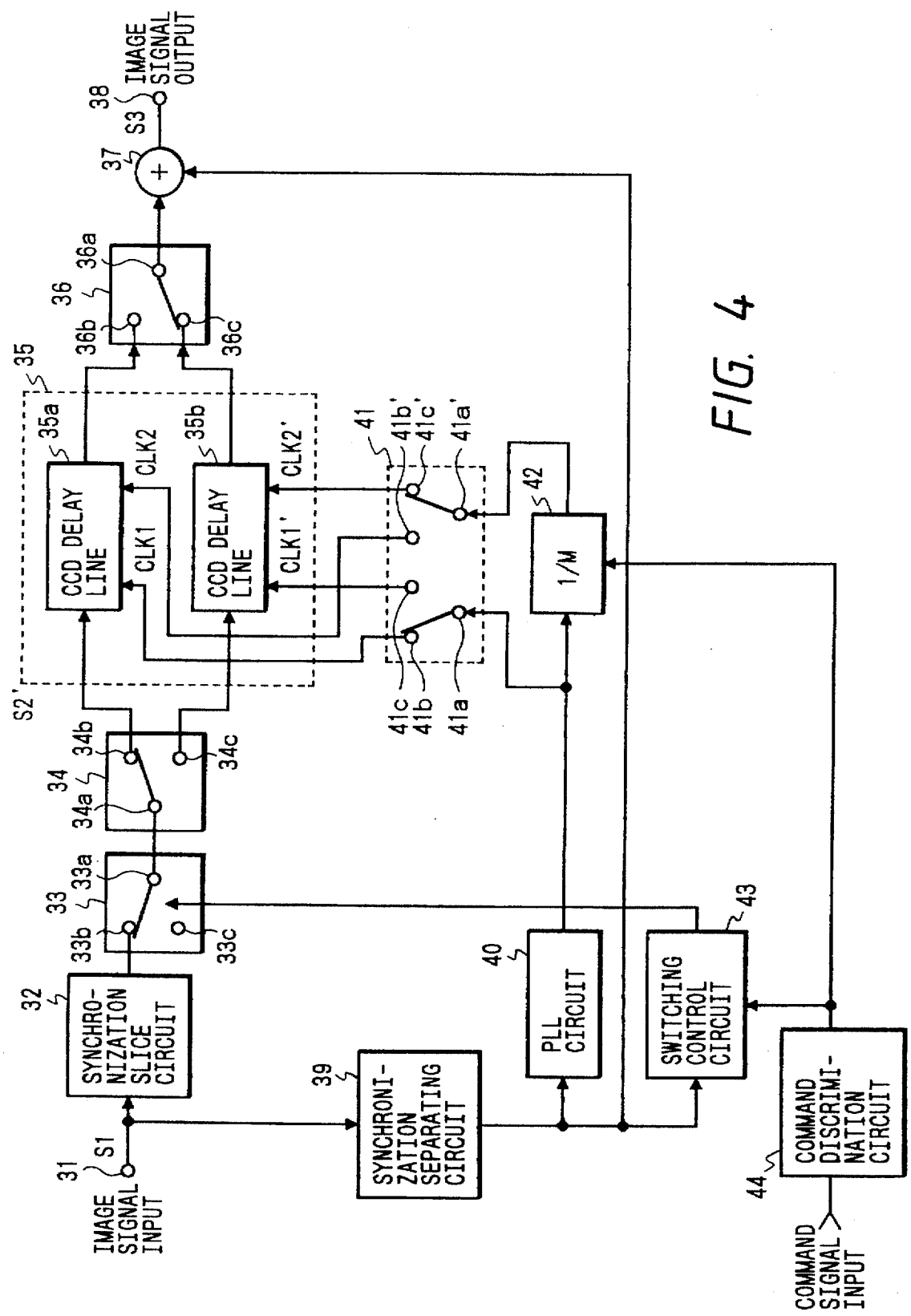
FIG. 4 is a block diagram of an image processing apparatus constituting a second embodiment of the present invention.

FIG. 4 is a block diagram of an image processing apparatus constituting a 2nd embodiment of the present invention. The analog image signal, generated in the image signal generator shown in FIG. 2 and corresponding to a horizontally compressed image, is entered from an input terminal 31, then subjected to the elimination of the synchronization signal by a synchronization slice circuit 32, and supplied to a first input switching circuit 33, which is controlled by a switching control circuit 43. More specifically said switching control circuit 43 generates a switching control signal according to the synchronization signal separated in a synchronization separating circuit 39 from the analog image signal entered from the input terminal 31 and also to a command signal released from a command discrimination circuit 44 to be explained later, and connects the output terminal 33a of the input switching circuit 33 with the input terminal 33b thereof for a period designated by said switching control signal. Said designated period is so selected that the result of expansion process to be explained later becomes equal to the effective horizontal image period of a monitor unit of an aspect ratio corresponding to the conventional television system and that a central part of thus expanded image signal is taken out.

The image signal released from the first input switching circuit 33 is guided to a second input switching circuit 34 and distributed to two output terminals 34b, 34c at every horizontal scanning period. The image signal from said second input switching circuit 34 enters a delay circuit 35 consisting of CCD (charge-coupled device) delay lines 35a, 35b. While the CCD delay line 35a receives the image signal, the other CCD delay line 35b releases the horizontally expanded image signal, and while the CCD delay line 35b receives the image signal, the other CCD delay line 35a releases the horizontally expanded image signal.

Clock signals for driving the delay circuit 35 are generated by a PLL circuit 40, based on the horizontal synchronization signal separated in the synchronization separating circuit 39 from the image signal entered from the input terminal 31. In the input operation of the image signal into the delay circuit 35, the clock signals released from the PLL circuit 40 are used as writing clock signals, and, in the readout operation, the clock signals from the PLL circuit 40 are subjected to a frequency division of 1/M (M being an integer) in a frequency divider 42 and used as the clock signals for data readout. The frequency division ratio 1/M is set by the command discrimination circuit 44 in response to a command signal entered from an unrepresented operation unit, in order to effect expansion in such a manner that the image signal from the input terminal 31 can be displayed as a distortion-free image on a monitor of an aspect ratio corresponding to the conventional television system.

In the delay circuit 35, when the CCD delay line 35a effects input operation of the image signal, the clock signals from the PLL circuit 40 are supplied to a first clock input terminal CLK1. At the same time, the clock signals released from the PLL circuit 40 and subjected to a frequency division of 1/M in the frequency divider 42 are supplied to a second clock input terminal CLK2' of the other CCD delay line 35b effecting the release of the image signal. Similarly, in case the CCD delay line 35a releases the image signal, the second clock input terminal CLK2 thereof receives the clock signals released from the PLL circuit 40 and subjected to a frequency division of 1/M in the frequency divider 42, and the other CCD delay line 35b, effecting the input of the image signal, receives, at the first clock input terminal CLK1' thereof, the clock signals released from the PLL circuit 40. In this manner the clock switching circuit 41 switches the clock signals supplied to the delay circuit 35 at every horizontal scanning period.

The image signal released from the delay circuit 35 is supplied to an output switching circuit 36, which releases said image signal by switching input terminals 36b, 36c at every horizontal scanning period, in synchronization with the CCD delay lines 35a, 35b. The expanded image signal from the output switching circuit 36 is subjected to the addition of synchronization signal in the synchronization attaching circuit 37, and is then released from an output terminal 38.

Figure 5:
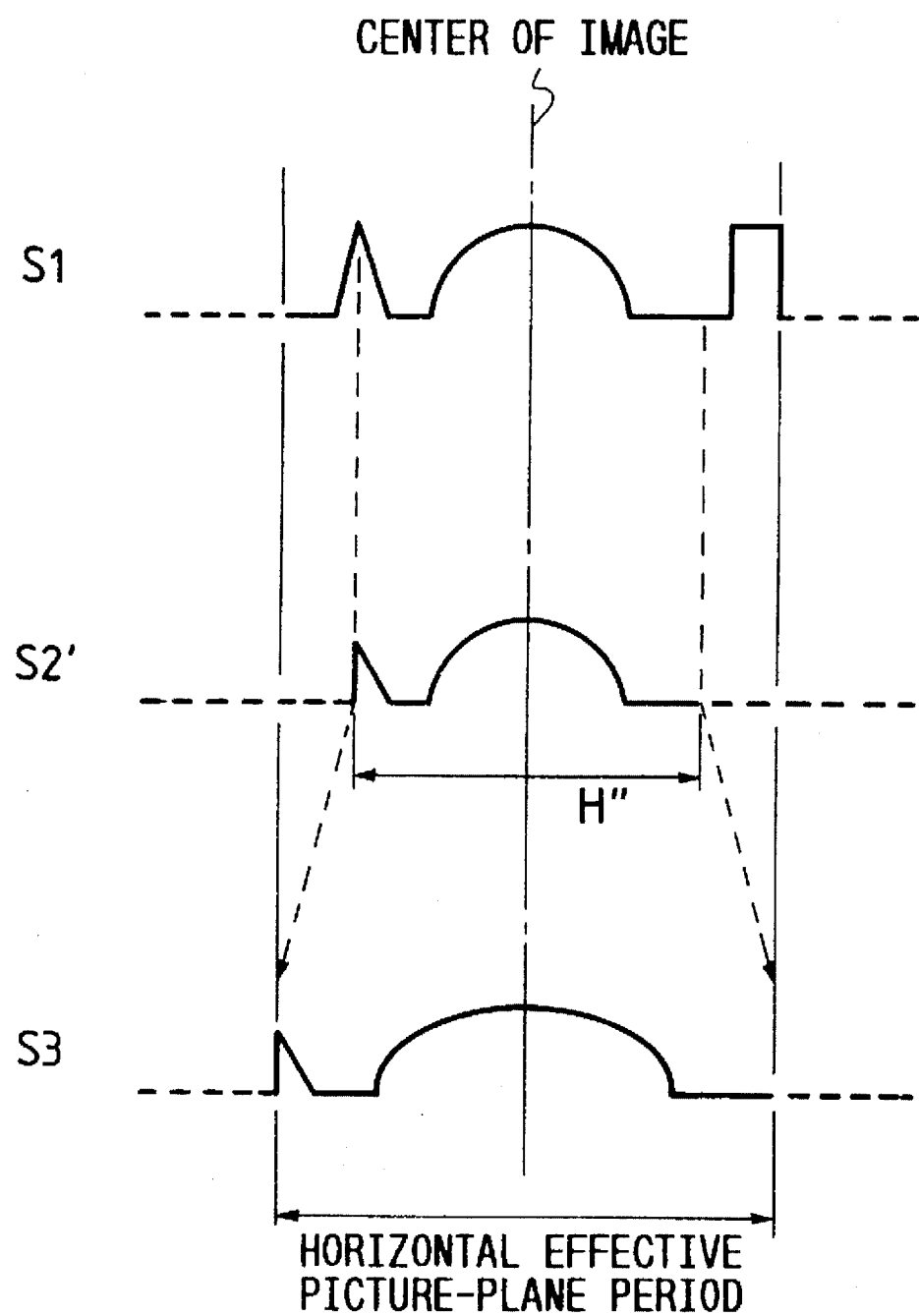
FIG. 5 is a wave form chart showing the image signal to be processed by the image processing apparatus shown in FIG. 4.

FIG. 5 illustrates the wave form of image signals processed in the image processing circuit shown in FIG. 4, wherein S1 is the wave form of the input image signal corresponding to a horizontally compressed image, S2' is the wave form of the image signal released from the second input switching circuit 34, and S3 is the wave form of the image signal obtained by expanding the image signal S2. Said signal S3 corresponds to the image signal released from the image processing circuit shown in FIG. 4 and can be displayed without distortion on a monitor of an aspect ratio corresponding to the conventional television system.

In the foregoing embodiments, the monitor is assumed to have an aspect ratio of 3:4 corresponding to the conventional television system, but the present invention is not limited to such case and is likewise applicable to the monitor of other television systems of different aspect ratioes, such as the high definition television system with an aspect ratio of 9:16.

As explained in the foregoing, the above-explained embodiments expands the image signal, corresponding to an image compressed in the horizontal direction with a predetermined compression rate, according to said predetermined compression rate and extracting the central part of thus expanded image signal, corresponding to the effective image frame area, thereby enabling to display a distortion-free image even on a monitor of a television system of an aspect ratio different from that of the expanded image signal.

Figure 6:
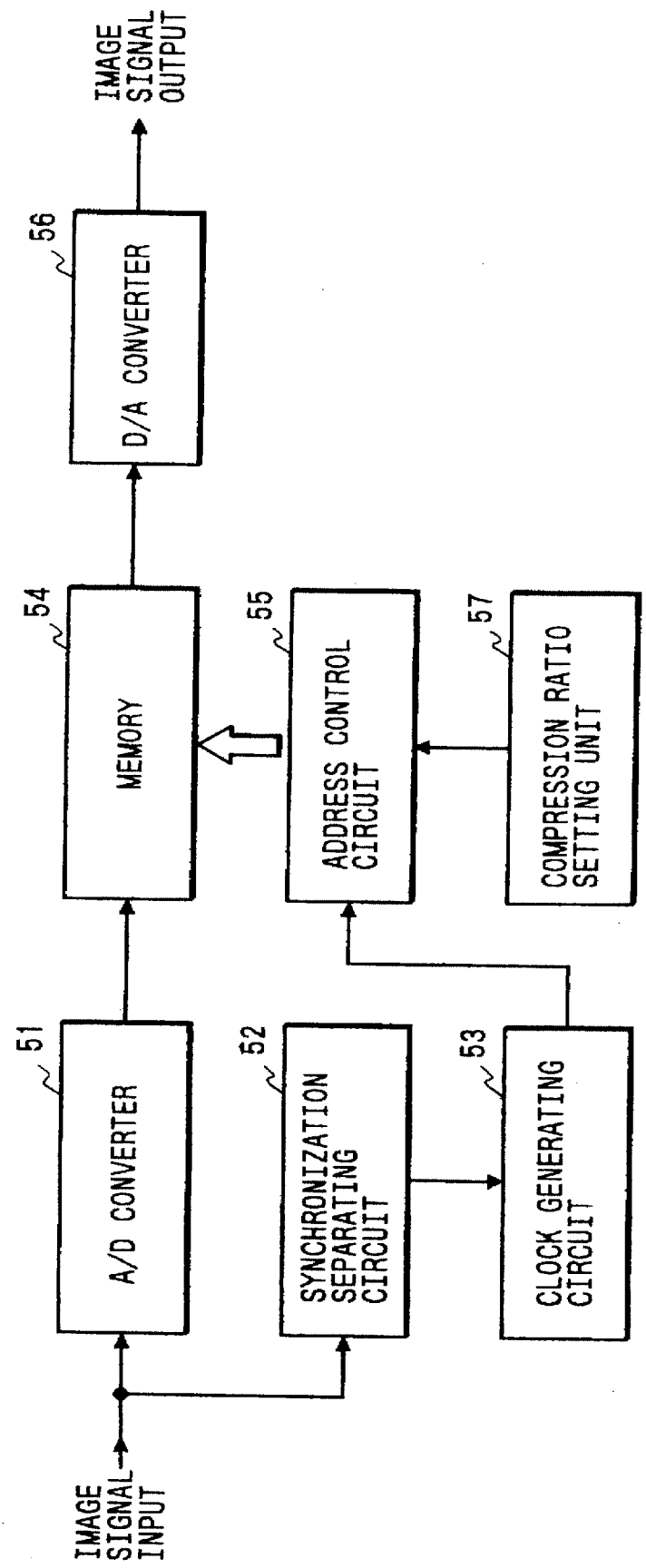
FIG. 6 is a block diagram of an image processing apparatus constituting a third embodiment of the present invention.

FIG. 6 is a block diagram of an image processing apparatus constituting a third embodiment of the present invention, wherein shown are an A/D converter 51 for digitizing the input image signal; a synchronization separation circuit 52 for separating the synchronization signal from the input image signal; a clock generating circuit 53 for generating clock signals, based on the synchronization signal separated in the synchronization separating circuit 52; a memory 54 for storing the image signal digitized in the A/D converter 51; an address control circuit 55 for address control for the memory 54; and a D/A converter 56 for converting the digital image signal, read from the memory 54, into an analog image signal.

The above-mentioned address control circuit 55 controls the readout address from said memory 54 according to the compression rate K set by a compression rate setting unit 57, and, in the present embodiment, substantially compresses the image, represented by the input image signal, in the vertical direction, by controlling the readout addresses in such a manner as to thin or skip the image signals corresponding to the horizontal scanning lines, according to said compression rate, among the image signal stored in the memory 54.

In the following there will be explained the function of the 3rd embodiment.

Figure 7:
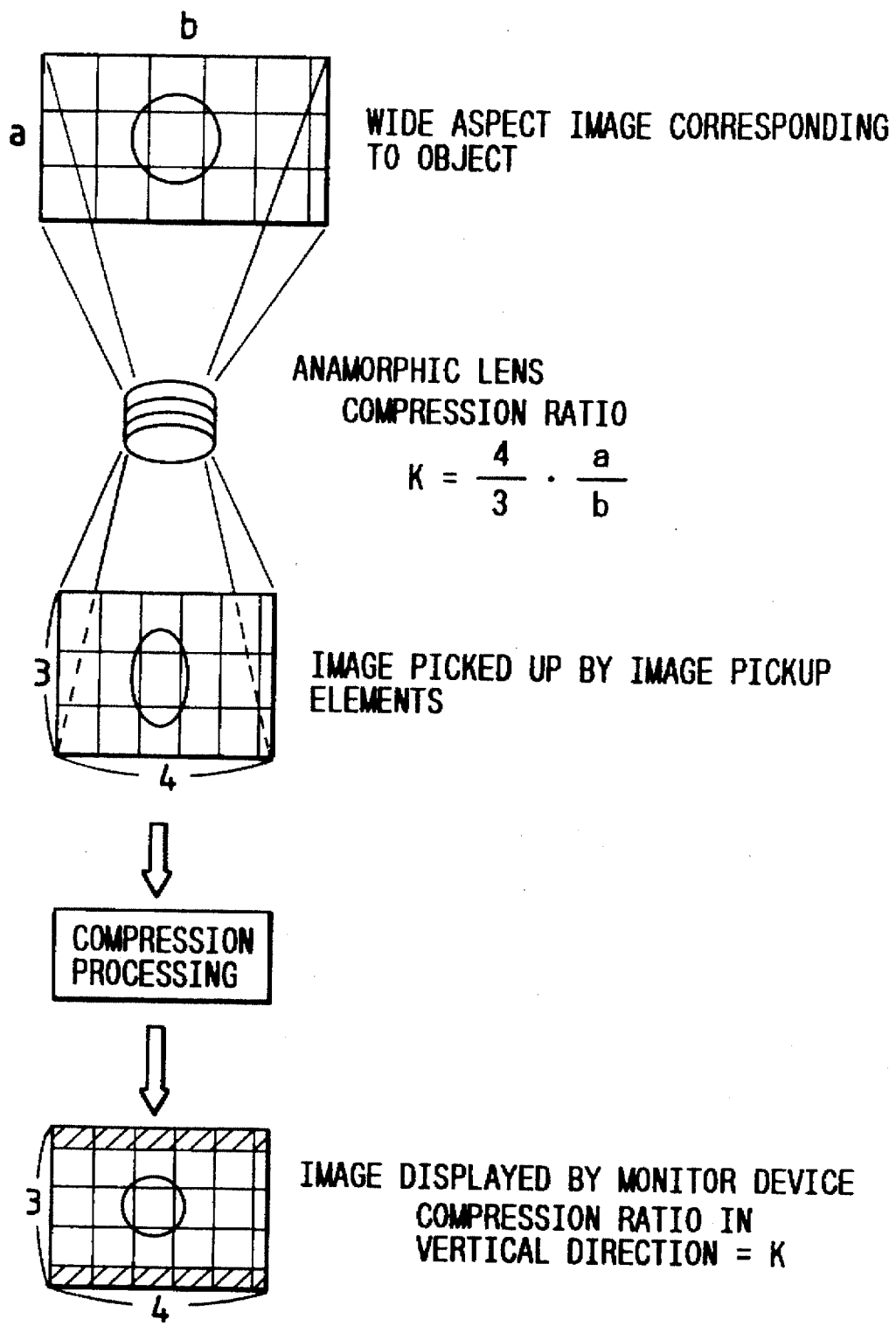
FIG. 7 is a view showing the function of the image processing apparatus shown in FIG. 6.

Referring to FIG. 7, when an object of an aspect ratio of a:b is optically compressed in the horizontal direction with an anamorphic lens for obtaining an image of a wider aspect ratio and is taken with an image pickup device of an aspect ratio of 3:4, there is obtained an image signal representing a distorted image because of different image magnifications in the vertical and horizontal directions.

The compression rate K in the horizontal direction by said anamorphic lens can be represented by i $K=4a/3b$.

The image signal, corresponding to such distorted image, is supplied to the A/D converter 51 shown in FIG. 6 and the image signal digitized in said A/D converter 51 is stored, by every field, into the memory 54.

At the readout of the image signal from said memory 54, the address control circuit 55 controls the readout addresses of the memory 54, according to the compression rate K set by the compression rate setting unit 57, in such a manner as to skip, for the image signal corresponding to every 3b scanning lines, the image signal of (3a–4b) scanning lines.

In the following there will be explained a specific example in which the horizontally wider image has an aspect ratio of a:b=9:16. In this case, the horizontal compression rate K of the object image by the anamorphic lens is represented by $K=4a/3b=(4\times9)/(3\times16)=3/4$.

Figure 8B:
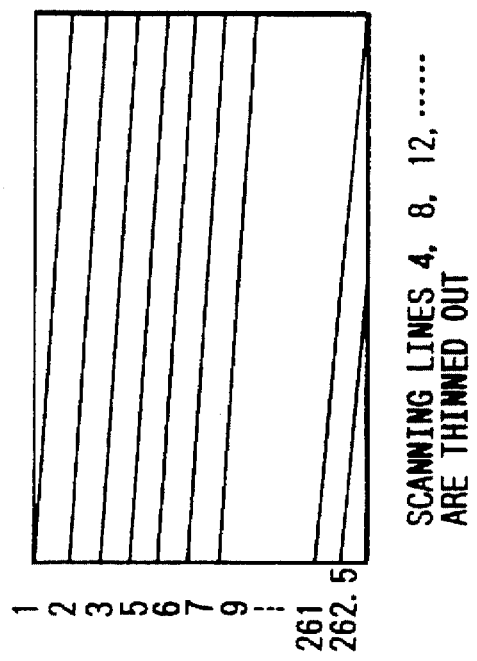
FIG. 8 is a view showing scanning line thinning process in the image processing apparatus shown in FIG. 6.
Figure 8A:
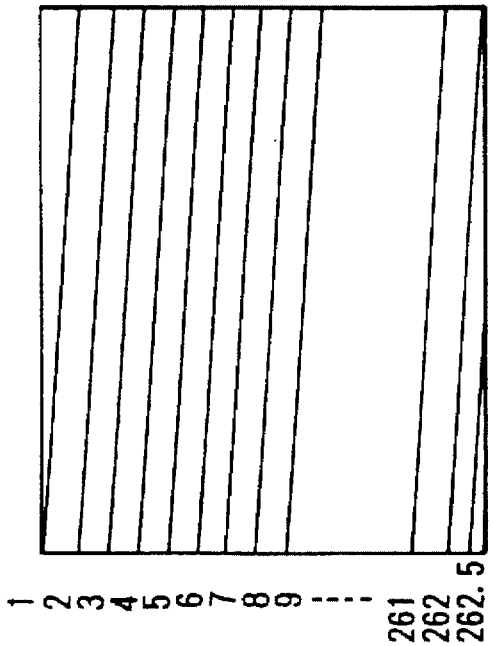

Consequently the address control circuit 55 controls the readout addresses of the memory 54 in such a manner, as shown in FIG. 8, as to skip the image signal of a scanning line for the image signal of every 4 scanning lines in the memory 54, whereby the image signal, of which number of scanning lines is thinned to 3/4, is read from said memory 54.

The digital image signal, read from the memory 54 under address control by the address control circuit 54, is converted by the D/A converter 56 into an analog image signal, then supplied to an unrepresented monitor and displayed in the central portion of the image field of said monitor as shown in FIG. 7. Since said output image signal is compressed with a compression rate in the vertical direction same as that in the horizontal direction, it can be displayed on the monitor without distortion.

The foregoing embodiment has described a case of display on a monitor of an aspect ratio of 3:4, but a distortion-free image can be obtained in general on a monitor with an aspect ratio of C:D through a similar process. More specifically, as the compression rate K for a monitor with an aspect ratio C:D is represented by $K =(a\times D)/(b\times C)$, a distortion-free image can be obtained by controlling the readout addresses of the memory 54 by the address control circuit 55 in such a manner as to skip the image signal corresponding to (b.C.–a.D) scanning lines from the image signal corresponding to every bC scanning lines.

The compression rate setting unit 57 in the foregoing embodiment may be so designed as to manually set the compression rate K through an operation of the operator on an operation unit, or to automatically set the compression rate by reading, at the compression, data representing said compression rate K and overlapped in the input image signal, in the vertical flyback period thereof.

Also in the foregoing embodiment, the compression is achieved by thinning the image signal, but it is also possible to correct the time axis of the image signal read from the memory 54, according to the set compression rate K.

Furthermore, though the foregoing embodiment is limited to the case of displaying, on the monitor, the image signal corresponding to a horizontally compressed image, but the present invention is naturally applicable to a case of displaying an image signal corresponding to a horizontally expanded image.

As explained in the foregoing, the foregoing embodiment is capable, in displaying an image signal corresponding to a horizontally compressed or expanded image, of effecting compression or expansion also in the vertical direction with a rate same as the compression or expansion rate of image in the horizontal direction, thereby showing a distortion-free image on the monitor.

What is claimed is:

1. An image conversion processing apparatus for converting a compressed image signal corresponding to a compressed image, formed by compressing an image having a first aspect ratio with a predetermined compression ratio in a horizontal direction, into an image signal corresponding to an image having a second aspect ratio different from the first aspect ratio, said apparatus comprising:

designation means for designating an expansion ratio corresponding to the predetermined compression ratio; and image signal processing means for performing thinning-out processing on the compressed image signal using a thinning-out ratio corresponding to the expansion ratio designated by the designation means, the thinning-out processing being performed so as to thin out, in a vertical direction, an image represented by the compressed image signal.

2. An apparatus according to claim 1, wherein said image signal processing means includes:

a) a memory for receiving and storing said compressed image signal; and b) memory control means for controlling a writing operation and a readout operation of said compressed image signal from said memory in accordance with a synchronization signal included in said compressed image signal.

3. An apparatus according to claim 1, wherein said image signal processing means includes:

a) a memory for receiving and storing said compressed image signal;

b) clock signal forming means for forming a clock signal synchronized with a synchronization signal contained in said compressed image signal;

c) writing control means for controlling a writing operation of the compressed image signal into said memory in accordance with the clock signal formed by said clock signal forming means; and d) readout control means for controlling a readout operation of the image signal from said memory in accordance with the thinning-out ratio corresponding to the expansion ratio designated by said designation means.

4. An apparatus according to claim 3, wherein said readout control means is arranged to thin out the image signal stored in said memory means on a unit basis of a horizontal scanning line according to the thinning-out ratio corresponding to the expansion ratio designated by said designation means.

5. An image conversion processing apparatus for inputting a compressed image signal corresponding to a compressed image formed by compressing an image having a first aspect ratio using a predetermined compression ratio in a horizontal direction, and converting the compressed image represented by the compressed image signal into an image having a second aspect ratio different from the first aspect ratio in order to display a converted image, said apparatus comprising:

designation means for designating an expansion ratio corresponding to the predetermined compression ratio;

image signal processing means for outputting an image signal corresponding to the image having the second aspect ratio by performing thinning-out processing on the compressed image signal using a thinning-out ratio corresponding to the expansion ratio designated by the designation means, the thinning-out processing being performed so as to thin out, in a vertical direction, the image represented by the compressed image signal; and image display means which includes a picture screen having the second aspect ratio, the image display means for displaying the image corresponding to the image signal output by the image signal processing means.

6. An apparatus according to claim 5, wherein said image signal processing means includes:

a) a memory for receiving and storing said compressed image signal; and b) memory control means for controlling a writing operation of the compressed image signal into said memory and for controlling a readout operation of the compressed image signal from said memory in such a manner that the compressed image signal entered into said memory becomes an image signal corresponding to the image having said second aspect ratio.

7. An apparatus according to claim 5, wherein said image signal reproduction processing means includes:

a) a memory for receiving and storing said compressed image signal;

b) clock signal forming means for forming a clock signal synchronized with a synchronization signal contained in said compressed image signal;

c) writing control means for controlling a writing operation of the compressed image signal into said memory in accordance with the clock signal formed by said clock signal forming means; and d) readout control means for controlling a readout operation of the image signal from said memory in accordance with the thinning-out ratio corresponding to the expansion ratio designated by said designation means.

* * * * *

UNITED STATES PATENT AND TRADEMARK OFFICE
CERTIFICATE OF CORRECTION

PATENT NO. : 5,673,086
DATED : September 30, 1997
INVENTOR(S) : Hiroyuki Fukuoka, et al.

It is certified that error appears in the above-identified patent and that said Letters Patent is hereby corrected as shown below:

TITLE PAGE

Under [56] References Cited, U.S. Patent Documents, "Morlta et al." should read "Morita et al.

COLUMN 6

Line 21, "i K=4a/3b" should read --K=4a/3b--.

Signed and Sealed this

Seventeenth Day of March, 1998

Attest:

BRUCE LEHMAN

Attesting Officer

Commissioner of Patents and Trademarks